(12) United States Patent
Xu et al.

(10) Patent No.: US 11,623,879 B2
(45) Date of Patent: Apr. 11, 2023

(54) APPLICATION OF TITANIUM CARBIDE/POROUS CARBON COMPOSITE IN ELECTROCHEMICAL TREATMENT OF URANIUM-CONTAINING WASTEWATER

(71) Applicant: Beijing Research Institute of Chemical Engineering Metallurgy, Beijing (CN)

(72) Inventors: Lechang Xu, Beijing (CN); Lei Zhou, Beijing (CN); Yang Peng, Beijing (CN); Mingtao Wu, Beijing (CN)

(73) Assignee: Beijing Research Institute of Chemical Engineering Metallurgy, Beijing (CN)

( * ) Notice: Subject to any disclaimer, the term of this patent is extended or adjusted under 35 U.S.C. 154(b) by 0 days.

(21) Appl. No.: 17/815,703

(22) Filed: Jul. 28, 2022

(65) Prior Publication Data
US 2023/0052767 A1    Feb. 16, 2023

(30) Foreign Application Priority Data

Jul. 28, 2021   (CN) .......................... 202110854238.0

(51) Int. Cl.
*C02F 1/461*     (2023.01)
*C02F 101/00*    (2006.01)

(52) U.S. Cl.
CPC ...... *C02F 1/46109* (2013.01); *C02F 2001/46133* (2013.01); *C02F 2101/006* (2013.01)

(58) Field of Classification Search
CPC .................................................. C02F 1/46109
See application file for complete search history.

(56) References Cited

FOREIGN PATENT DOCUMENTS

WO    WO-2004046045 A1 *  6/2004  .............. C02F 1/463

OTHER PUBLICATIONS

First Office Action, Issued by National Intellectual Property Administration of the People's Republic of China, China App. No. 202110854238.0, dated Nov. 30, 2021.
(Continued)

*Primary Examiner* — Peter Keyworth
(74) *Attorney, Agent, or Firm* — Thomas | Horstemeyer, LLP

(57) ABSTRACT

The present disclosure provides an application of a titanium carbide/porous carbon composite in electrochemical treatment of uranium-containing wastewater, and belongs to the technical field of wastewater treatment. The present disclosure provides the application of the titanium carbide/porous carbon composite in electrochemical treatment of uranium-containing wastewater. Titanium carbide (TiC) is a typical transition metal carbide and has good conductivity and excellent chemical stability; compared with a titanium dioxide/carbon nanomaterial, the titanium carbide/porous carbon composite has a rich pore structure that provides a large number of activated adsorption sites for adsorption of metal ions during electro-adsorption, so that the electro-adsorption efficiency can be substantially improved, and a better electro-adsorption effect is obtained.

10 Claims, 1 Drawing Sheet

(56) References Cited

OTHER PUBLICATIONS

Lv, Zhimin, et al., "Enhanced removal of uranium(VI) from aqueous solution by a novel Mg-MOF-74-derived porous MgO/carbon absorbent," Journal of Colloid and Interface Science, vol. 537 (2019) (10 pages).

Zhang, L. L., et al., "Preparation of MIL-125 (Ti) / NH2-MIL125 (Ti) materials and their adsorption properties for uranylions," Acta Scientiae Circumstantiae, vol. 40, No. 6 (2020) (11 pages).

Liu, Tao, et al., "Photothermal enhancement of uranium capture from seawater by monolithic MOF-bonded carbon sponge," Chemical Engineering Journal, vol. 412 (2021) (9 pages).

\* cited by examiner

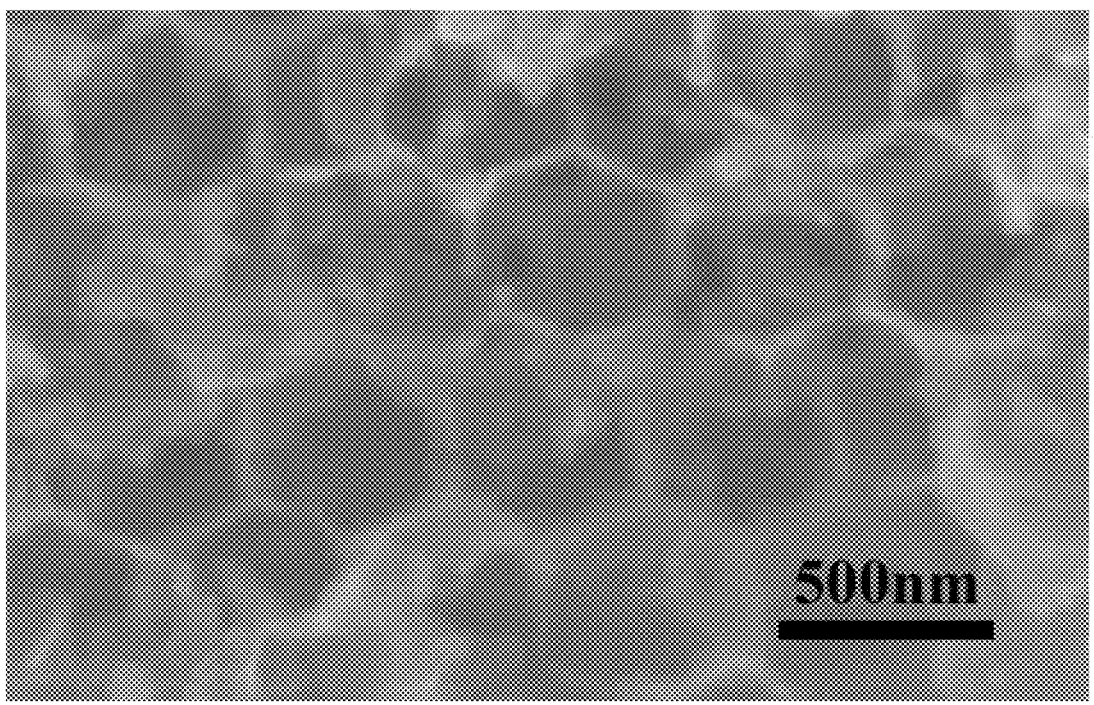

APPLICATION OF TITANIUM CARBIDE/POROUS CARBON COMPOSITE IN ELECTROCHEMICAL TREATMENT OF URANIUM-CONTAINING WASTEWATER

CROSS REFERENCE TO RELATED APPLICATION

This patent application claims the benefit and priority of Chinese Patent Application No. 202110854238.0, filed on Jul. 28, 2021, the disclosure of which is incorporated by reference herein in its entirety as part of the present application.

TECHNICAL FIELD

The present disclosure relates to the technical field of wastewater treatment, in particular to an application of a titanium carbide/porous carbon composite in electrochemical treatment of uranium-containing wastewater.

BACKGROUND ART

Uranium is a common radioactive element. In the natural environment, uranium exists in the form of various chemical species, such as oxides, precipitates, complexes and natural minerals, as well as in the form of elements. Hexavalent uranium and tetravalent uranium are the most common forms of uranium oxidation in natural systems. Uranium concentrations are higher in uranium mining and processing plants. The main part of these pollutants will accumulate in the upper layers of the soil or in the aquatic sediments. Due to its radioactivity and toxicity, the World Health Organization (WHO) and the Environmental Protection Agency (EPA) have set the limit of drinking water to 0.13 µM (30 µg/L). Higher levels of uranium in the human body can affect renal function, and very high concentrations may cause renal failure. The main mechanism underlying the entry of uranium in the human body is through ingestion of contaminated water and inhalation of contaminated dust, especially in places where soil and groundwater are contaminated with radioactive waste.

Electro-adsorption is an emerging electrochemical desalination technology, which has the advantages of high energy efficiency, low environmental impact and low cost. Electro-adsorption is a kind of surface adsorption induced by electrical charges generated at low bias potential. Pollutants with opposite charges are enriched on the electrode surface through Coulomb interaction, thereby increasing the adsorption capacity of the adsorbent. When a charging voltage or current is applied, salt ions are transported by electro-adsorption and trapped in the electric double layer in the pores. Then, the battery is usually regenerated by discharging at zero voltage (or reverse bias) or constant current to release the adsorbed ions. Compared with other deionization technologies, electro-adsorption is an innovative water purification technology, which has attracted much attention due to its low energy consumption, low cost, rapid regeneration and environmental friendliness.

However, in the prior art, the removal of uranium in wastewater by electro-adsorption has the problems of low adsorption efficiency and poor adsorption effect.

SUMMARY

In view of this, an objective of the present disclosure is to provide an application of a titanium carbide/porous carbon composite in electrochemical treatment of uranium-containing wastewater. In the present disclosure, the titanium carbide/porous carbon composite material is used to adsorb uranium, and effectively solves the problems of low adsorption efficiency and poor adsorption effect of conventional carbon materials used in the prior art.

To achieve the above objective, the present disclosure provides the following technical solution:

The present disclosure provides an application of a titanium carbide/porous carbon composite in electrochemical treatment of uranium-containing wastewater.

Preferably, uranium in the uranium-containing wastewater may exist in the form of uranium(VI).

Preferably, a concentration of the uranium(VI) in the uranium-containing wastewater may be 20-50 mg/L.

Preferably, the electrochemical treatment may be conducted at a working voltage of 0-1.4 V, the working voltage may not be 0, and inlet flow rate may be 15-35 mL/min.

Preferably, the titanium carbide/porous carbon composite may be fabricated by a method including the following steps:

mixing polystyrene microspheres, isopropanol, a titanium source and terephthalic acid to obtain a gel;

conducting a first calcination on the gel under argon atmosphere to obtain a precursor material; and mixing the precursor material with a carbon source, and conducting a second calcination under argon atmosphere to obtain the titanium carbide/porous carbon composite.

Preferably, the first calcination may be conducted at a temperature of 600-800° C. for 2-4 h.

Preferably, a process of the second calcination may be calcination at 600-800° C. for 2 h, heating to 1,250-1,300° C., and holding for 2 h.

Preferably, the polystyrene microspheres, the titanium source and the terephthalic acid may have a weight ratio of 10:(4-7):1.

Preferably, the polystyrene microspheres may be 450 nm±16 nm in particle size.

Preferably, the titanium carbide/porous carbon composite material may be used in the form of a titanium carbide/porous carbon composite electrode, and the titanium carbide/porous carbon composite electrode may be fabricated by drop casting of the titanium carbide/porous carbon composite on carbon paper.

The present disclosure provides an application of a titanium carbide/porous carbon composite in electrochemical treatment of uranium-containing wastewater. Titanium carbide (TiC) is a typical transition metal carbide and has good conductivity and excellent chemical stability; compared with a titanium dioxide/carbon nanomaterial, the titanium carbide/porous carbon composite has a rich pore structure that provides a large number of activated adsorption sites for adsorption of metal ions during electro-adsorption, so that the electro-adsorption efficiency can be substantially improved, and a better electro-adsorption effect is obtained.

Further, the titanium carbide/porous carbon composite in the present disclosure may be fabricated by a method including the following steps: mixing polystyrene microspheres, isopropanol, a titanium source and terephthalic acid to obtain a gel; conducting a first calcination on the gel under argon atmosphere to obtain a precursor material; and mixing the precursor material with a carbon source, and conducting a second calcination under argon atmosphere to obtain the titanium carbide/porous carbon composite. The present disclosure uses a titanium (Ti)-based metal-organic framework (MOF) as a template to synthesize the titanium carbide/porous carbon composite. The material not only has a rich pore structure that can provide a large number of activated adsorption sites, but also solve the problem of insufficient competitive adsorption because of the existence of a large number of oxygen-containing groups. In addition, the high specific surface area and pore structure of the titanium carbide/porous carbon composite may be more conducive to the infiltration of the solution and the adsorption of uranium ions, thereby obtaining a better electro-adsorption effect.

BRIEF DESCRIPTION OF THE DRAWINGS

FIG. 1 is a scanning electron micrograph of a titanium carbide/porous carbon composite fabricated in Example 1.

DETAILED DESCRIPTION OF THE EMBODIMENTS

The present disclosure provides an application of a titanium carbide/porous carbon composite in electrochemical treatment of uranium-containing wastewater.

In the present disclosure, uranium in the uranium-containing wastewater may preferably exist in the form of uranium(VI). Sources of the uranium-containing wastewater are not particularly limited in the present invention, as long as the sources well known to those skilled in the art may be used.

In the present disclosure, a concentration of the uranium (VI) in the uranium-containing wastewater may preferably be 20-50 mg/L, and more preferably 30-40 mg/L.

In the present disclosure, the electrochemical treatment may preferably be conducted at a working voltage of 0-1.4 V, and the working voltage may not be 0, and more preferably 0.8 V, 1.0 V, 1.2 V or 1.4 V; inlet flow rate may preferably be 15-35 mL/min, and more preferably 15, 20, 25, 30, or 35 mL/min.

In the present disclosure, the electrochemical treatment may preferably be conducted at pH 6.

In the present disclosure, the titanium carbide/porous carbon composite may preferably be fabricated by a method including the following steps:

mixing polystyrene microspheres, isopropanol, a titanium source and terephthalic acid to obtain a gel;

conducting a first calcination on the gel under argon atmosphere to obtain a precursor material; and mixing the precursor material with a carbon source, and conducting a second calcination under argon atmosphere to obtain the titanium carbide/porous carbon composite.

In the present disclosure, polystyrene microspheres, isopropanol, a titanium source and terephthalic acid are mixed to obtain a gel.

In the present disclosure, the polystyrene microspheres may preferably be 450 nm±16 nm in particle size.

In the present disclosure, the polystyrene microspheres may preferably be prepared by a method including the following steps:

mixing styrene with water, heating, adding an aqueous solution of potassium persulfate to react under argon atmosphere to obtain a white emulsion; sequentially filtering, washing and drying the white emulsion to obtain the polystyrene microspheres.

In the present disclosure, the styrene and the water may preferably have a volume ratio of 3:80.

In the present disclosure, the heating may preferably be conducted at a temperature of 70° C.

In the present disclosure, the aqueous solution of potassium persulfate may preferably have a concentration of 0.3-0.4 M.

In the present disclosure, the reaction may preferably be conducted for 12 h.

In the present disclosure, the titanium source may preferably be titanium(IV) isopropoxide or tetrabutyl titanate.

In the present disclosure, the polystyrene microspheres have an excellent dispersion effect in isopropanol, and the titanium source used later may preferably be titanium(IV) isopropoxide. The isopropanol used may provide a better solvent environment without introducing other organic groups.

In the present disclosure, the terephthalic acid may be an organic dicarboxylic acid, which may provide an acidic environment in the present disclosure to promote the production of metatitanic acid, and further hydrolysis of the metatitanic acid may produce titanium dioxide; moreover, a weakly acidic environment may adjust the acidity of a system to prevent excessive hydrolysis of titanium ions.

In the present disclosure, the polystyrene microspheres, the titanium source and the terephthalic acid may preferably have a weight ratio of 10:(4-7):1, and more preferably 10:5:1.

In the present disclosure, it may be preferable to disperse the polystyrene microspheres in the isopropanol, stir for 3 h, add the titanium source and the terephthalic acid, keep stirring for 4 h, and dry at 70° C. for 48 h to obtain the gel. In the present disclosure, in the process of keeping stirring, after the titanium source is added, an overall color is light yellow, and as stirring time increases, the color turns white, and a white gelatinous substance is finally obtained.

In the present disclosure, after the gel is obtained, a first calcination is conducted on the gel under argon atmosphere to obtain a precursor material.

In the present disclosure, the first calcination may preferably be conducted at a temperature of 600-800° C. for 2-4 h. In the present disclosure, the first calcination may preferably be conducted in a tube furnace. In the present disclosure, the temperature may preferably rise from room temperature to a temperature of the first calcination at a rate of 2° C./min. During the first calcination, the titanium source may be attached to the polystyrene microspheres to form a Ti-based MOF.

In the present disclosure, the first calcination may preferably obtain a black titanium dioxide/porous carbon nanocomposite precursor material.

In the present disclosure, after the precursor material is obtained, the precursor material is mixed with a carbon source, and a second calcination is conducted under argon atmosphere to obtain the titanium carbide/porous carbon composite.

In the present disclosure, the carbon source may preferably be carbon black.

In the present disclosure, a process of the second calcination may preferably be calcination at 600-800° C. for 2 h, heating to 1,250-1,300° C., and holding for 2 h. In the present disclosure, the temperature may preferably rise from 600-800° C. to 1,250-1,300° C. at a rate of 5° C./min during the second calcination.

In the present disclosure, the titanium carbide/porous carbon composite material may preferably be used in the form of a titanium carbide/porous carbon composite electrode, and the titanium carbide/porous carbon composite electrode may preferably be fabricated by drop casting of the titanium carbide/porous carbon composite on carbon paper.

In the present disclosure, the titanium carbide/porous carbon composite electrode may be preferably 1×1 cm in size.

In the present disclosure, after the titanium carbide/porous carbon composite electrode is obtained, it may be preferable to assemble the titanium carbide/porous carbon composite electrode into an electro-adsorption module for electro-adsorption to remove heavy metal ion uranium(VI) from water.

In the present disclosure, after the use, desorption regeneration of the electrode may be further preferably included. The desorption regeneration may preferably be implemented by short-circuit desorption at a voltage of 0 V until a conductivity in a solution returns to the original value when the electrode is not in use, namely, the desorption regeneration of the electrode is realized.

In order to further illustrate the present disclosure, the application of the titanium carbide/porous carbon composite in electrochemical treatment of uranium-containing wastewater provided by the present disclosure will be described in detail below in conjunction with examples, but they should not be construed as limiting the protection scope of the present disclosure.

Example 1

Fabrication of a titanium carbide/porous carbon composite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 10 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 600° C. for 2 h under argon atmosphere, kept heating up to 1,250° C. at a heating rate of 5° C./min, and held for 2 h to obtain a titanium carbide/porous carbon composite.

FIG. 1 is a scanning electron micrograph of the titanium carbide/porous carbon composite fabricated in Example 1. It can be seen from FIG. 1 that the pores of the titanium carbide/porous carbon composite fabricated by the present disclosure have a macroporous structure, which can provide a larger adsorption area during the electro-adsorption experiment, and can effectively increase the uranium(VI) adsorption efficiency during the electro-adsorption.

Example 2

Fabrication of a titanium carbide/porous carbon nanocomposite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 8 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 600° C. for 2 h under argon atmosphere, kept heating up to 1,250° C. at a heating rate of 5° C./min, and held for 2 h to obtain a titanium carbide/porous carbon composite.

Fabrication of a titanium carbide/porous carbon composite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 12 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 600° C. for 2 h under argon atmosphere, kept heating up to 1,250° C. at a heating rate of 5° C./min, and held for 2 h to obtain a titanium carbide/porous carbon composite.

Example 4

Fabrication of a titanium carbide/porous carbon composite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 14 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 600° C. for 2 h under argon atmosphere, kept heating up to 1,250° C. at a heating rate of 5° C./min, and held for 2 h to obtain a titanium carbide/porous carbon composite.

Example 5

Fabrication of a titanium carbide/porous carbon composite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 10 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 700° C. for 2 h under argon atmosphere, kept heating up to 1,250° C. at a heating rate of 5° C./min, and held for 2 h to obtain a titanium carbide/porous carbon composite.

Example 6

Fabrication of a titanium carbide/porous carbon composite: 12 mL of styrene and 320 mL of deionized water were mixed and heated to 70° C.; under argon atmosphere, 10 mL of 0.3 M aqueous solution of potassium persulfate was added, and the mixture was stirred at 60 rpm and held at 70° C. for 28 h to yield a white emulsion; the emulsion was centrifuged, washed with deionized water and ethanol thrice, and dried at 30° C. for 4 h to obtain white powdery polystyrene microspheres;

20 g of dried polystyrene microspheres was dispersed in 300 mL of isopropanol solution, stirred at 80 rpm for 3 h, supplemented with 10 g of tetrabutyl titanate and 2 g of terephthalic acid, kept stirring at the same rotational speed for 4 h, and dried at 70° C. for 48 h; under argon atmosphere, the mixture was calcined in a tube furnace at 600° C. for 2 h at a heating rate of 2° C./min to obtain a black titanium dioxide/porous carbon composite precursor material; and 12 g of titanium dioxide/porous carbon nanocomposite precursor material and 36 g of carbon black were mechanically mixed uniformly, calcined in the tube furnace at 800° C. for 2 h under argon atmosphere, kept heating up to 1,250° C. at a heating rate of 5° C./min, and held for 2 h to obtain a titanium carbide/porous carbon composite.

Example 7

Fabrication of a titanium carbide/porous carbon composite electrode: The electrode material was fabricated by adding 600 μL of ultrapure water, 390 μL of absolute ethanol and 10 μL of Nafion solution to 10 mg of titanium carbide/porous carbon composite and 1 mg of conductive carbon black; after sonication, the materials were drop-casted on the 1×1 cm carbon paper, and the drop-casted material was dried to obtain a titanium carbide/porous carbon nanocomposite electrode.

Assembly of an electro-adsorption module: The electro-adsorption module was assembled by using the titanium carbide/porous carbon nanocomposite electrode fabricated by the above process was used as a working electrode, a platinum sheet as a counter electrode, and an Ag/AgCl electrode as a reference electrode.

Comparative Example 1

The fabrication process of the titanium carbide/porous carbon nanocomposite electrode was the same as that in Example 7.

The titanium carbide/porous carbon nanocomposite in Example 7 was replaced with the titanium carbide/porous carbon composites fabricated in Examples 1, 2, 3, and 4 sequentially to fabricate a working electrode and assemble an electro-adsorption module; a 1.2 V working voltage was applied to the electro-adsorption module, and the inlet flow rate was controlled at 30 mL/min to adsorb and desorb a 30 mg/L uranium-containing solution to conduct an electro-adsorption experiment. The experimental results are shown in Table 1. It can be seen that the titanium carbide/porous carbon nanocomposite obtained under the conditions of Example 1 has an excellent adsorption effect.

Table 1 The effects of titanium carbide/porous carbon composites in Examples 1 to 4 on the efficiency of electro-adsorption for uranium removal

|  | Experimental group | | | |
| --- | --- | --- | --- | --- |
|  | Example 1 | Example 2 | Example 3 | Example 4 |
| Uranium adsorption rate (%) | 58.56 | 55.02 | 52.03 | 50.11 |

Comparative Example 2

The fabrication process of the titanium carbide/porous carbon composite electrode was the same as that in Example 7.

The titanium carbide/porous carbon nanocomposite in Example 7 was replaced with the titanium carbide/porous carbon composites fabricated in Examples 1, 5, and 6 sequentially to fabricate a working electrode and assemble an electro-adsorption module; a 1.2 V working voltage was applied to the electro-adsorption module, and the inlet flow rate was controlled at 30 mL/min to adsorb and desorb a 30 mg/L uranium-containing solution to conduct an electro-adsorption experiment. The experimental results are shown in Table 2. It can be seen that the titanium carbide/porous carbon nanocomposite obtained under the conditions of Example 1 has an excellent adsorption effect.

Table 2 The effects of titanium carbide/porous carbon composites in Examples 1, 5, and 6 on the efficiency of electro-adsorption for uranium removal

|  | Experimental group | | |
| --- | --- | --- | --- |
|  | Example 1 | Example 5 | Example 6 |
| Uranium adsorption rate (%) | 58.74 | 54.01 | 51.85 |

Application Example 1

The fabrication process of the titanium carbide/porous carbon composite was the same as that in Example 2, and the fabrication process of the titanium carbide/porous carbon composite electrode was the same as that in Example 7.

The electro-adsorption module assembled with titanium carbide/porous carbon composite electrode was subjected to an experiment of electro-adsorption treatment of uranium-containing solution. The experimental conditions were set to a voltage of 1.0 V and an inlet flow rate of 25 mL/min. The effects of electro-adsorption treatment of uranium were investigated when the initial uranium content was 50 mg/L, 40 mg/L, 30 mg/L, and 20 mg/L, respectively. The experimental results are shown in Table 3. It can be seen that the electrode has an excellent effect of treating uranium in the solution.

Table 3 The effect of the initial content of uranium in the solution on the efficiency of electro-adsorption for uranium removal in Application Example 1

|  | Initial content (mg/L) | | | |
| --- | --- | --- | --- | --- |
|  | 50 | 40 | 30 | 20 |
| Uranium adsorption rate (%) | 40.46 | 57.21 | 59.95 | 56.56 |

Application Example 2

The fabrication process of the titanium carbide/porous carbon composite was the same as that in Example 2, and the fabrication process of the titanium carbide/porous carbon composite electrode was the same as that in Example 7.

The electro-adsorption module assembled with titanium carbide/porous carbon composite electrode was subjected to an experiment of electro-adsorption treatment of uranium-containing solution. The selected experimental conditions were that the uranium concentration was 100 mg/L and the applied working voltage was 1.2 V, and the experiment investigated the adsorption effect of the titanium carbide/porous carbon composite electrode when the inlet flow rate was 15 mL/min, 20 mL/min, 25 mL/min, 30 mL/min, and 35 mL/min, respectively. The experimental results are shown in Table 4. It can be seen that the adsorption effect of the titanium carbide/porous carbon nanocomposite electrode is the most excellent when the inlet flow rate is 30 mL/min.

Table 4 The effect of the inlet flow rate on the efficiency of electro-adsorption for uranium removal in Application Example 2

|  | Inlet flow rate (mL/min) | | | | |
| --- | --- | --- | --- | --- | --- |
|  | 15 | 20 | 25 | 30 | 35 |
| Uranium adsorption rate (%) | 37.56 | 40.13 | 47.65 | 57.79 | 49.42 |

Application Example 3

The fabrication process of the titanium carbide/porous carbon composite was the same as that in Example 2, and the fabrication process of the titanium carbide/porous carbon composite electrode was the same as that in Example 7.

The electro-adsorption module assembled with titanium carbide/porous carbon composite electrode was subjected to an experiment of electro-adsorption treatment of uranium-containing solution. A solution with an initial uranium content of 30 mg/L was selected, the inlet flow rate was controlled at 30 mL/min, voltages of 0 V, 0.8 V, 1.0 V, 1.2 V, and 1.4 V were applied, respectively, and the electro-adsorption module assembled with titanium carbide/porous carbon nanocomposite electrode was subjected to an experiment of electro-adsorption treatment of uranium. The results are shown in Table 5. It can be seen that at a working voltage of 1.2 V, the titanium carbide/porous carbon nanocomposite electrode has a superior adsorption effect.

Table 5 The effect of working voltage on the efficiency of electro-adsorption for uranium removal in Application Example 3

|  | Working voltage (V) | | | | |
| --- | --- | --- | --- | --- | --- |
|  | 0 | 0.8 | 1.0 | 1.2 | 1.4 |
| Uranium adsorption rate (%) | 9.96 | 45.31 | 53.26 | 60.38 | 48.55 |

Application Example 4

The fabrication process of the titanium carbide/porous carbon composite was the same as that in Example 2, and the fabrication process of the titanium carbide/porous carbon composite electrode was the same as that in Example 7.

The electro-adsorption module assembled with titanium carbide/porous carbon composite electrode was subjected to an experiment of electro-adsorption treatment of uranium-containing solution. A working voltage of 1.2 V was applied, the inlet flow rate was controlled at 30 mL/min to adsorb and desorb the 30 mg/L uranium-containing solution, and its adsorption rate and desorption rate were calculated. The experimental results are shown in Table 6. After the first cycling experiment, the adsorption rate was 63.43%; after 6 cycling experiments, the removal rate was only reduced by 3.22%, indicating that it has excellent regeneration capacity.

Table 6 The effect of the number of electrode recycling/regeneration in Application Example 4

| Cycle number | 1 | 2 | 3 | 4 | 5 | 6 |
| --- | --- | --- | --- | --- | --- | --- |
| Uranium adsorption rate (%) | 63.43 | 62.52 | 62.33 | 61.46 | 60.97 | 60.21 |
| Uranium desorption rate (%) | 77.96 | 78.31 | 79.22 | 79.98 | 80.21 | 80.03 |

The above are only the preferred implementations of the present disclosure, and do not limit the present disclosure in any form. It should be noted that a person of ordinary skill in the art may further make several improvements and modifications without departing from the principle of the present disclosure, and these improvements and modifications should be deemed as falling within the protection scope of the present disclosure.

What is claimed is:

1. A process for using a titanium carbide/porous carbon composite in electrochemical treatment of uranium-containing wastewater, comprising the following steps:
    applying the titanium carbide/porous carbon composite in the form of a titanium carbide/porous carbon composite electrode,
    wherein the titanium carbide/porous carbon composite electrode is fabricated by drop casting of the titanium carbide/porous carbon composite on carbon paper, and the titanium carbide/porous carbon composite is fabricated by a method comprising the following steps:
    mixing polystyrene microspheres, isopropanol, a titanium source and terephthalic acid to obtain a gel;
    conducting a first calcination on the gel under argon atmosphere to obtain a precursor material; and
    mixing the precursor material with a carbon source, and conducting a second calcination under argon atmosphere to obtain the titanium carbide/porous carbon composite.

2. The process according to claim 1, wherein uranium in the uranium-containing wastewater exists in the form of uranium(VI).

3. The process according to claim 1, wherein a concentration of uranium in the uranium-containing wastewater is 20-50 mg/L.

4. The process according to claim 2, wherein a concentration of the uranium(VI) in the uranium-containing wastewater is 20-50 mg/L.

5. The process according to claim 1, wherein the electrochemical treatment is conducted at a working voltage of 0-1.4 V, the working voltage is not 0, and an inlet flow rate is 15-35 mL/min.

6. The process according to claim 2, wherein the electrochemical treatment is conducted at a working voltage of 0-1.4 V, the working voltage is not 0, and an inlet flow rate is 15-35 mL/min.

7. The process according to claim 1, wherein the first calcination is conducted at a temperature of 600-800° C. for 2-4 h.

8. The process according to claim 1, wherein the second calcination is conducted by calcining at 600-800° C. for 2 h, then heating to 1,250-1,300° C., and holding for 2 h.

9. The process according to claim 1, wherein the polystyrene microspheres, the titanium source and the terephthalic acid have a weight ratio of 10:(4-7):1.

10. The process according to claim 1, wherein the polystyrene microspheres are 450 nm±16 nm in particle size.

* * * * *